April 17, 1962 W. A. GROESBECK 3,029,639
MANIFOLDED CONE PRESSURE PROBE
Filed Sept. 29, 1959

WILLIAM A. GROESBECK
INVENTOR.

BY Q. Baxter Warner
Claude Funkhouser
ATTORNEYS

United States Patent Office 3,029,639
Patented Apr. 17, 1962

3,029,639
MANIFOLDED CONE PRESSURE PROBE
William A. Groesbeck, Silver Spring, Md., assignor to the United States of America as represented by the Secretary of the Navy
Filed Sept. 29, 1959, Ser. No. 843,320
2 Claims. (Cl. 73—212)

This invention relates generally to pressure probes; more particularly, it relates to a manifolded cone pressure probe for use in measuring cone pressure in applications where the air stream velocity is in excess of the sonic velocity.

It is an object of this invention to provide a cone pressure probe so constructed as to obtain an accurate measurement of cone pressure.

Another object of the invention is to provide a cone pressure probe having such a configuration that it is relatively insensitive to the angle of attack.

A further object of this invention is to provide a cone pressure probe that is economical to construct.

Other objects and many of the attendant advantages of this invention will be readily appreciated as the same becomes better understood by reference to the following detailed description when considered in connection with the accompanying drawing, wherein.

A problem has existed as to the measurement of aerial vehicle velocities when such are in excess of the sonic velocity. One method of measuring such velocities is by employing the known Mach number relationships between ram pressure (the head-on pressure) and cone pressure. This method, however, has not been as successful as desired because of the lack of a probe capable of obtaining accurate cone pressure at various angles of attack.

Ram pressure, as is well known, may be accurately determined by the use of conventional conical or blunt square-tipped pressure probes and is relatively insensitive to the angle of attack, the angle of attack being defined as the angle between the longitudinal axis of the pressure probe and the free stream direction of the air flow.

Cone pressure, which is herein considered to be that pressure present at a point on the surface of a cone-shaped object over which an air stream is moving at supersonic velocity, varies both with Mach number and with the angle of attack. As long as the central axis of the cone carried by the conical probe is aligned with the free stream direction of the air flow, the cone pressure will have the same value at any point on the surface of the cone. Under such circumstances the cone pressure is easily determined, measurement at one point on the cone surface being all that is required. However, under normal conditions of use the central axis of the cone will not always be aligned with the free stream direction of the air flow but will often be at an angle thereto, such angle being referred to as the angle of attack. When the cone is at such an angle the cone pressure on the cone surface will be greater on the windward side than on the leeward side thereof, the pressure varying from one point on the circumference of the cone to a second point on the same circumference. As the angle of attack varies, the pressures at spaced points on the circumference likewise vary. The fact that cone pressure varies with the angle of attack has made it difficult to obtain true Mach number velocities in actual flight conditions. It is therefore desirable to obtain a cone pressure probe that is relatively insensitive to the angle of attack. It is such a probe that is the subject of this invention.

The conical probe of the present invention contemplates the obtaining of cone pressure by employing the resultant of pressures taken at a plurality of equally spaced points on a circumference of the cone surface. Such a resultant pressure has been found to furnish a cone pressure that is relatively insensitive to angle of attack.

Figure 1:
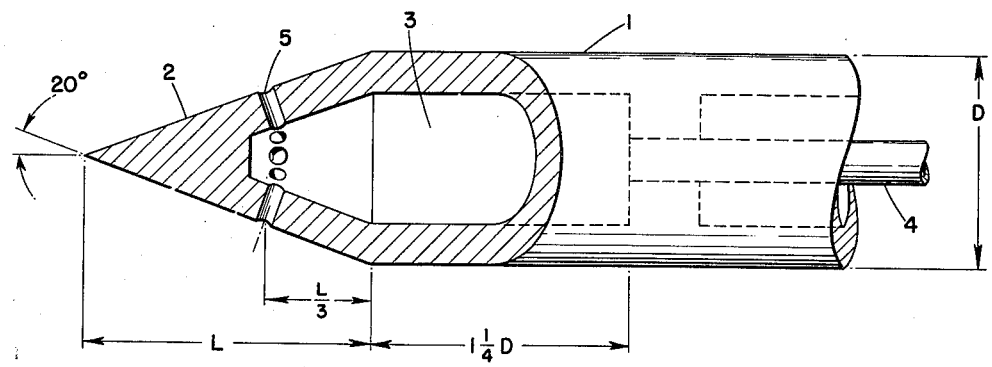
FIG. 1 is a fragmentary view of a manifolded cone pressure probe.

Referring to FIG. 1 of the drawing, a probe body is shown at 1, said body having a cone surface 2 thereon and a manifold chamber 3 therein. A cone pressure conduit 4 communicates the interior of the manifold chamber 3 with a pressure measuring means (not shown). The angle of the cone must be such that the flow of supersonic air thereover is attached to (in contact with) the cone surface 2, an angle of about 20° having been found to provide the desired attachment. A plurality of equally-spaced orifices 5 are disposed on a circumference of the cone and communicate the cone surface 2 with the manifold chamber 3, whereby the cone pressure present at each of a number of positions on said circumference of the cone surface 2 is conveyed to the manifold chamber 3. The orifices 5 are arranged at an angle substantially normal to the cone surface 2. The number of orifices employed is primarily a matter of design, although it has been found that eight orifices appear to provide maximum effectiveness. The cone surface 2 should overlie the manifold chamber 3 sufficiently to allow for proper positioning of the orifices 5. It should be noted that the cone pressure along any line on the cone surface that is aligned with the central axis of the cone will be the same at all points along that line regardless of the angle of attack. Inasmuch as such is true, the precise longitudinal location of the orifices is principally a matter of design. In the embodiment shown in FIG. 1 the orifices are placed at circumferential points substantially two-thirds of the distance from the tip to the base of the conical surface 2. The volume of the manifold chamber and the length and diameter of the probe are not too critical, these being matters of design.

As the angle of attack of the manifold cone probe is altered, a pressure differential will be created between the windward and leeward sides thereof. However, the pressure within the manifold chamber 3, which is the resultant of the pressures conveyed from the conical surface 2 by the equally spaced orifices 5, is relatively insensitive to the angle of attack of the probe. Thus, a cone pressure for use in measuring Mach number is made available that is relatively independent of angle of attack.

Figure 2:
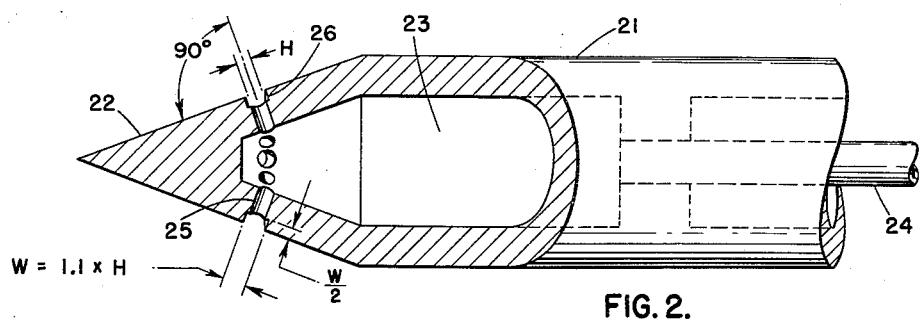
FIG. 2 is a fragmentary view of a modified manifolded cone pressure probe employing a circumferential groove.

A modified form of the invention is shown in FIG. 2. The conical probe shown therein comprises a body 21 having a cone surface 22 thereon and a manifold chamber 23 therein, there being a plurality of orifices 25 communicating the conical surface 22 with the manifold chamber 23. A cone pressure conduit 24 places the manifold chamber 23 in communication with pressure measuring means (not shown). The above structure is identical to that of FIG. 1. In this modification a circumferential groove 26 is positioned on the cone surface 22, the orifices 25 being in communication therewith. As the angle of attack varies the groove 26 allows the pressurized air on the cone surface to flow from the orifices on the high pressure, or windward, side of the conical probe to the orifices on the low pressure, or leeward, side. The effect of such flow is to give a more accurate and steady pressure within the manifold chamber 23. The grooved construction is especially useful at higher Mach numbers, such as those in excess of about Mach 3.5. The width and depth of the groove are matters of design, the relationships shown in FIG. 2 being found to provide the desired results.

Figure 3:
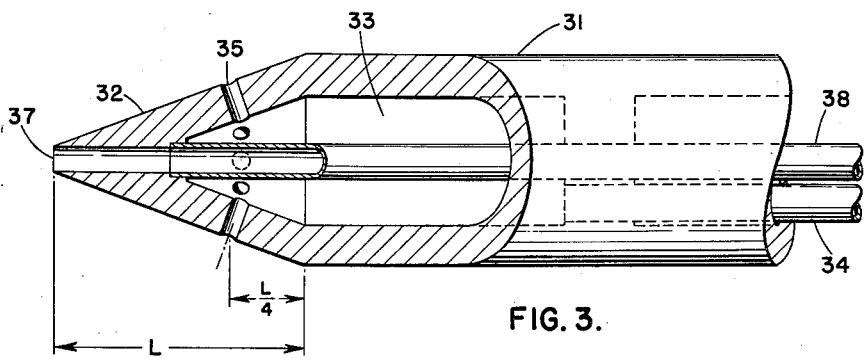
FIG. 3 is a fragmentary view of a manifolded cone pressure probe in combination with a ram pressure probe.

The construction shown in FIG. 3 is similar to that shown in FIG. 1 with the exception that the probe for measuring ram pressure is combined with that for measuring cone pressure. The probe of FIG. 3 comprises a body 31 having a cone surface 32 thereon and a manifold chamber 33 therein, there being a plurality of orifices 35 communicating the conical surface 32 with the manifold chamber 33. A ram orifice 37 is placed at the tip of the probe, a ram pressure conduit 38 communicating said ram orifice 37 with a pressure measuring means (not shown). A cone pressure conduit 34 communicates the manifold chamber 33 with a pressure measuring means (not shown). The combined probe of FIG. 3 eliminates the need for separate probes and therefore results in a simple overall Mach number measuring system. It should be noted that while the longitudinal position of the orifices in FIG. 3 is different from that in FIG. 1, such is a mere matter of design and is not critical. Also, it is obvious that a circumferential groove such as that shown at 26 in FIG. 2 could be employed in the probe of FIG. 3 if it is so desired.

The probe may be constructed of metal or other suitable material. The overall size of the probe is not too critical, and it may accordingly be of almost any desired size. Moreover, the probe may, of course, be used in other applications than that disclosed herein.

Obviously many modifications and variations of the present invention are possible in the light of the above teachings. It is therefore to be understood that within the scope of the appended claims the invention may be practiced otherwise than as specifically described.

What is claimed is:

1. A manifolded cone pressure probe for measuring cone pressure in a supersonic airstream, comprising, a body having a cone surface thereon, a manifold chamber disposed within said body, a plurality of circumferentially spaced orifices in said body communicating said cone surface with said manifold chamber, and a groove in the cone surface connecting said orifices to provide a fluid conducting connection between the orifices at their outer ends to permit the flow of air in said groove from the windward side of said probe to the leeward side thereof, whereby the chamber pressure will be caused to represent the cone pressure at any angle of said probe in said supersonic airstream.

2. A manifold cone pressure probe for measuring cone pressure in a supersonic airstream, comprising, a body having a cone surface on one end thereof, a manifold chamber disposed within said body, said cone surface overlying at least a portion of said manifold chamber, a plurality of circumferentially spaced orifices in said body communicating said cone surface with said manifold chamber, a circumferential groove in the cone surface connecting said orifices to provide a fluid conducting connection between the orifices at their outer ends to permit the flow of air in said groove from the windward side of said probe to the leeward side thereof, and conduit means for conducting fluid from said chamber through said body, whereby the chamber pressure will be caused to represent the cone pressure at any angle of said probe in said supersonic airstream.

References Cited in the file of this patent

UNITED STATES PATENTS

| 2,512,278 | Jones | June 20, 1950 |
| 2,662,402 | Ince et al. | Dec. 15, 1953 |
| 2,679,163 | Morris et al. | May 25, 1954 |
| 2,876,640 | Beach et al. | Mar. 10, 1959 |

FOREIGN PATENTS

| 473,562 | Great Britain | Oct. 15, 1937 |
| 689,474 | Great Britain | Mar. 25, 1953 |

OTHER REFERENCES

"Considerations Entering Into the Selection of Probes for Pressure Measurement in Jet Engines" (Gettelman and Krause), Instruments, September 1953, vol. 26, pages 1385–1388. (Copy in div. 36.)